(12) United States Patent
Ma et al.

(10) Patent No.: US 12,106,109 B2
(45) Date of Patent: *Oct. 1, 2024

(54) DATA PROCESSING APPARATUS AND RELATED PRODUCT

(71) Applicant: Anhui Cambricon Information Technology Co., Ltd., Hefei (CN)

(72) Inventors: Xuyan Ma, Hefei (CN); Jianhua Wu, Hefei (CN); Shaoli Liu, Hefei (CN); Xiangxuan Ge, Hefei (CN); Hanbo Liu, Hefei (CN); Lei Zhang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 151 days.

This patent is subject to a terminal disclaimer.

(21) Appl. No.: 17/620,527

(22) PCT Filed: Apr. 28, 2021

(86) PCT No.: PCT/CN2021/090674
§ 371 (c)(1),
(2) Date: Jan. 19, 2023

(87) PCT Pub. No.: WO2021/223643
PCT Pub. Date: Nov. 11, 2021

(65) Prior Publication Data
US 2023/0297379 A1    Sep. 21, 2023

(30) Foreign Application Priority Data

May 8, 2020  (CN) .......................... 202010390294.9

(51) Int. Cl.
*G06F 9/355*    (2018.01)
*G06F 9/30*     (2018.01)
*G06F 9/345*    (2018.01)

(52) U.S. Cl.
CPC .......... *G06F 9/355* (2013.01); *G06F 9/30043* (2013.01); *G06F 9/30047* (2013.01); *G06F 9/345* (2013.01)

(58) Field of Classification Search
CPC ............. G06F 9/30036; G06F 9/30038; G06F 9/3004; G06F 9/30043; G06F 9/30047;
(Continued)

(56) References Cited

U.S. PATENT DOCUMENTS 5,689,653 A * 11/1997 Karp .................... G06F 9/30036
                                                   712/E9.047
8,495,301 B1 * 7/2013 Alexander .............. G06F 13/28
                                                   710/22

(Continued)

FOREIGN PATENT DOCUMENTS

| CN | 107301453 A | 10/2017 |
| CN | 107301454 A | 10/2017 |
| CN | 110018847 A | 7/2019 |

OTHER PUBLICATIONS

PCT/CN2021/090674—International Search Report and Written Opinion, mailed Jul. 26, 2021, 10 pages. (with English translation).

*Primary Examiner* — Andrew Caldwell
*Assistant Examiner* — Kasim Alli
(74) *Attorney, Agent, or Firm* — Getech Law LLC; Jun Ye

(57) ABSTRACT

The present disclosure relates to a data processing apparatus and related products. The data processing apparatus includes a decoding unit, a discrete-address determining unit, a continuous-data caching unit, a data read/write unit, and a storage unit. Through the data processing apparatus, the processing instruction may be decoded and executed. Discrete data may be transferred to a continuous data address, or continuous data may be stored to multiple discrete data addresses. As such, a vector computation of discrete data (Continued)

and vector data restoration after the vector computation may be implemented, which may simplify a processing process, thereby reducing data overhead.

8 Claims, 4 Drawing Sheets

(58) Field of Classification Search
CPC .......... G06F 9/34; G06F 9/345; G06F 9/3455; G06F 9/35; G06F 9/355; G06F 15/80; G06F 15/8053; G06F 15/8061; G06F 15/8069

See application file for complete search history.

(56) References Cited

U.S. PATENT DOCUMENTS

| | | | |
|---|---|---|---|
| 2011/0138122 A1* | 6/2011 | Hughes | G06F 12/0897 711/E12.017 |
| 2012/0144089 A1* | 6/2012 | Hall | G06F 9/30043 711/3 |
| 2012/0151156 A1* | 6/2012 | Citron | G06F 9/30036 711/E12.001 |
| 2013/0326160 A1* | 12/2013 | Sperber | G06F 9/3887 711/E12.001 |
| 2017/0168731 A1 | 6/2017 | Tsao et al. | |
| 2018/0253309 A1* | 9/2018 | Stephens | G06F 9/3555 |
| 2020/0210186 A1* | 7/2020 | Ould-Ahmed-Vall | G06F 12/0811 |
| 2021/0406026 A1* | 12/2021 | Forsyth | G06F 9/30105 |

\* cited by examiner

DATA PROCESSING APPARATUS AND RELATED PRODUCT

CROSS-REFERENCE TO RELATED APPLICATIONS

This is a 371 of International Application No. PCT/CN2021/090674, filed Apr. 28, 2021, which claims priority to Chinese Patent Application No. 202010390294.9, filed May 8, 2020, and entitled "METHOD AND APPARATUS FOR DATA PROCESSING AND RELATED PRODUCT", which is incorporated herein by reference in its entirety.

TECHNICAL FIELD

This present disclosure relates to the field of computer technology, and particularly to a data processing apparatus and related products.

BACKGROUND

With the development of artificial intelligence technology, the artificial intelligence technology has made great progress in image recognition and other fields. During image recognition, a large number of discrete data points may need to be processed (such as performing a difference computation). However, a process of processing discrete data points by means of related technologies is relatively complicated, resulting in relatively high data overhead.

SUMMARY

In view of this, it is necessary to provide a data processing apparatus and related products, to solve the above technical problems.

A first aspect of the present disclosure provides a data processing apparatus. The data processing apparatus includes a decoding unit, a discrete-address determining unit, a continuous-data caching unit, a data read/write unit, and a storage unit.

The decoding unit is configured to decode a received processing instruction to obtain a decoded processing instruction, and determine a plurality of pieces of data corresponding to the processing instruction, a source data base address of the plurality of pieces of data, a destination data base address of the plurality of pieces of data, a data offset address of discrete data of the plurality of pieces of data, and a data size of continuous data of the plurality of pieces of data, where the source data of the plurality of pieces of data includes the discrete data or the continuous data. The decoding unit is further configured to determine a first storage address of the continuous data according to a base address of the continuous data and the data size of the continuous data.

The discrete-address determining unit is coupled with the decoding unit and the data read/write unit, and is configured to determine a second storage address of discrete data according to the discrete data base address and a data offset address of the discrete data. The discrete-address determining unit is also configured to send the second storage address to the data read/write unit.

The continuous-data caching unit is coupled with the decoding unit and the data read/write unit and is configured to create a cache space of continuous data. The continuous-data caching unit is also configured to cache continuous data of the first storage address into the cache space and send the continuous data to the data read/write unit, or cache continuous data received from the data read/write unit into the cache space and send the continuous data to the first storage address.

The data read/write unit is coupled with the storage unit and is configured to read discrete data from the storage unit according to the second storage address of the discrete data and send the read discrete data to the continuous-data caching unit, or receive continuous data from the continuous-data caching unit and write the received continuous data into the storage unit according to a storage address of discrete data.

A second aspect of the present disclosure provides an artificial intelligence chip. The artificial intelligence chip includes the above data processing apparatus.

A third aspect of the present disclosure provides an electronic device. The electronic device includes the above artificial intelligence chip.

A fourth aspect of the present disclosure provides a board card. The board card includes a storage component, an interface apparatus, a control component, and the above artificial intelligence chip. The artificial intelligence chip is coupled with the storage component, the control component, and the interface apparatus. The storage component is configured to store data. The interface apparatus is configured to implement data transmission between the artificial intelligence chip and an external device. The control component is configured to monitor a state of the artificial intelligence chip.

According to embodiments of the present disclosure, the processing instruction may be decoded and executed. Discrete data may be transferred to a continuous data address, or continuous data may be stored to multiple discrete data addresses. As such, a vector computation of discrete data and vector data restoration after the vector computation may be implemented, which may simplify a processing process, thereby reducing data overhead.

By deriving technical features in claims, advantageous effects corresponding to the technical problems in the BACKGROUND may be achieved. Exemplary embodiments will be described below in detail with reference to accompanying drawings, and other features and aspects of the present disclosure will become clear.

BRIEF DESCRIPTION OF THE DRAWINGS

Accompanying drawings contained in the specification and constituting a part of the specification together with the specification illustrate exemplary embodiments, features, and aspects of the present disclosure, and are used to explain the principle of the present disclosure.

DETAILED DESCRIPTION

Figure 1:
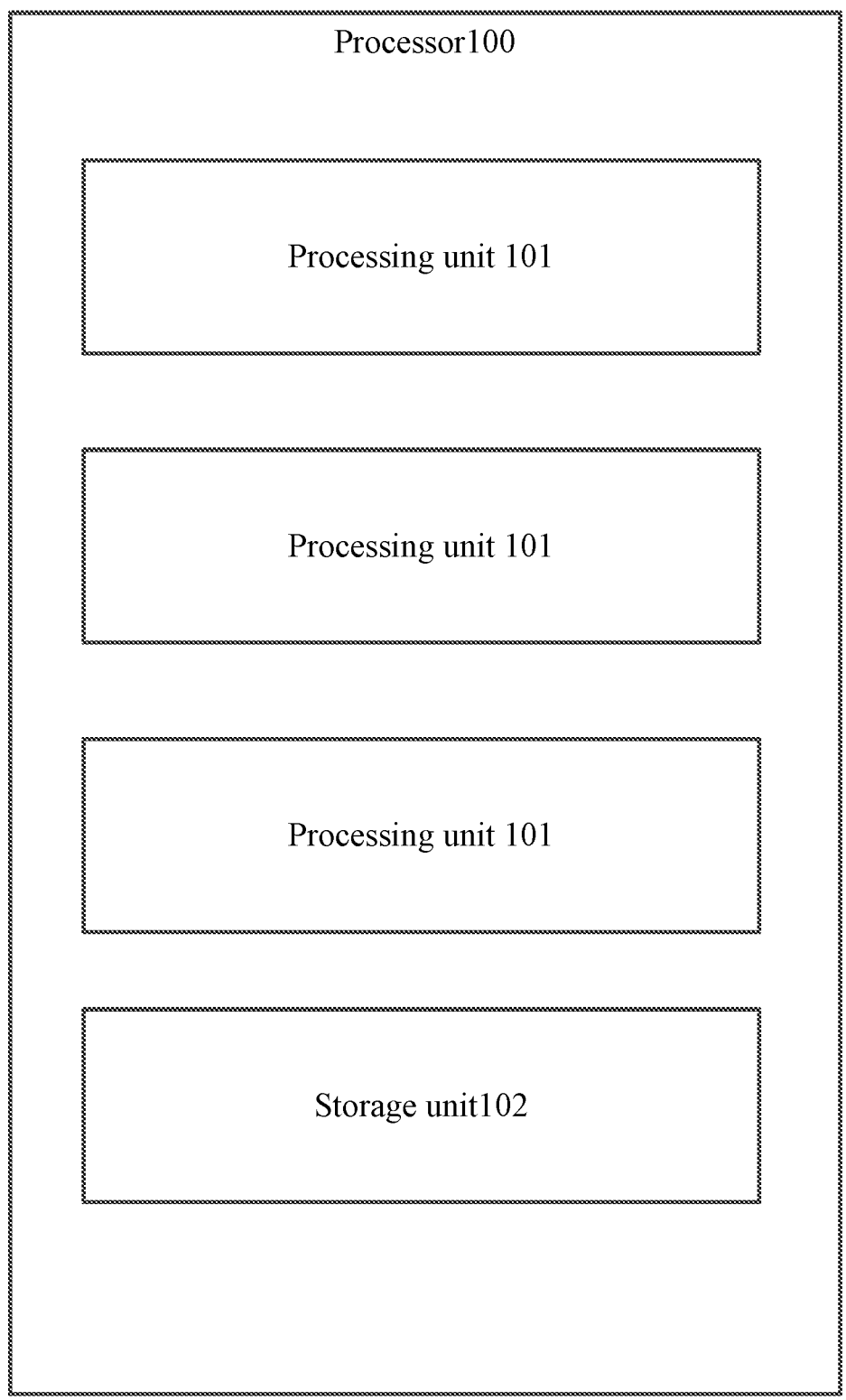
FIG. 1 is a schematic diagram of a processor of a data processing apparatus, according to an embodiment of the present disclosure.

Hereinafter, technical solutions of embodiments of the present disclosure will be described in a clear and comprehensive manner with reference to accompanying drawings in the embodiments. It is evident that the embodiments described herein are some rather than all embodiments of the present disclosure. Other embodiments derived by those of ordinary skill in the art based on these embodiments without making creative efforts shall all fall within the protection scope of the present disclosure.

It should be understood that, the terms "include/comprise" and "contain" as well as variations thereof used in the specification and claims of the present disclosure mean existence of features, wholes, steps, operations, elements, and/or components described, but do not exclude existence or addition of one or more other features, wholes, steps, operations, elements, components, and/or sets.

It should also be understood that, terms used in the specification of the present disclosure are merely for describing a specific embodiment, and not intended to limit the present disclosure. As used in the specification and claims of the present disclosure, unless the context clearly indicates otherwise, the terms "a/an", "a piece of", and "the/this" in a singular form, and the like may means including a plural form. It should be further understood that, the term "and/or" used in the specification and claims of the present disclosure refers to any combination and all possible combinations of one or more of items listed in association, and includes these combinations.

As used in the specification and claims, the term "if" may be interpreted as "when", "once", "in response to a determination", or "in response to a case where something is detected" depending on the context. Similarly, the terms "if it is determined that" or "if [the condition or event described] is detected" may be interpreted as "once it is determined that", "in response to a determination", or "once [the condition or event described] is detected", or "in response to a case where [the condition or event described] is detected" depending on the context.

A data processing apparatus of embodiments of the present disclosure may be applied to a processor. The processor may be a general-purpose processor, such as a central processing unit (CPU), or an intelligence processing unit (IPU) configured to perform artificial intelligence computations. The artificial intelligence computation may include a machine learning computation, a brain-like computation, and the like. The machine learning computation may include a neural network computation, a k-means computation, a support vector machine computation, and the like. The IPU may include, for example, one or a combination of a graphics processing unit (GPU), a neural-network processing unit (NPU), a digital signal processing (DSP) chip, and a field-programmable gate array (FPGA) chip. The type of the processor is not limited by the present disclosure.

In a possible implementation, the processor of the present disclosure may include multiple processing units, and each of the processing units may independently run various assigned tasks, such as convolution computation task, pooling task, or full connection task. The processing unit and a task run by the processing unit are not limited by the present disclosure.

FIG. 1 is a schematic diagram of a processor of a data processing apparatus according to an embodiment of the present disclosure. As illustrated in FIG. 1, a processor 100 includes multiple processing units 101 and a storage unit 102. The multiple processing units 101 are configured to execute instruction sequences. The storage unit 102 is configured to store data. The storage unit 102 may include a random access memory (RAM) and a register file. The multiple processing units 101 of the processor 100 may not only share part of a storage space (for example, share part of a RAM storage space and a register file), but also have their own storage space.

Figure 2:
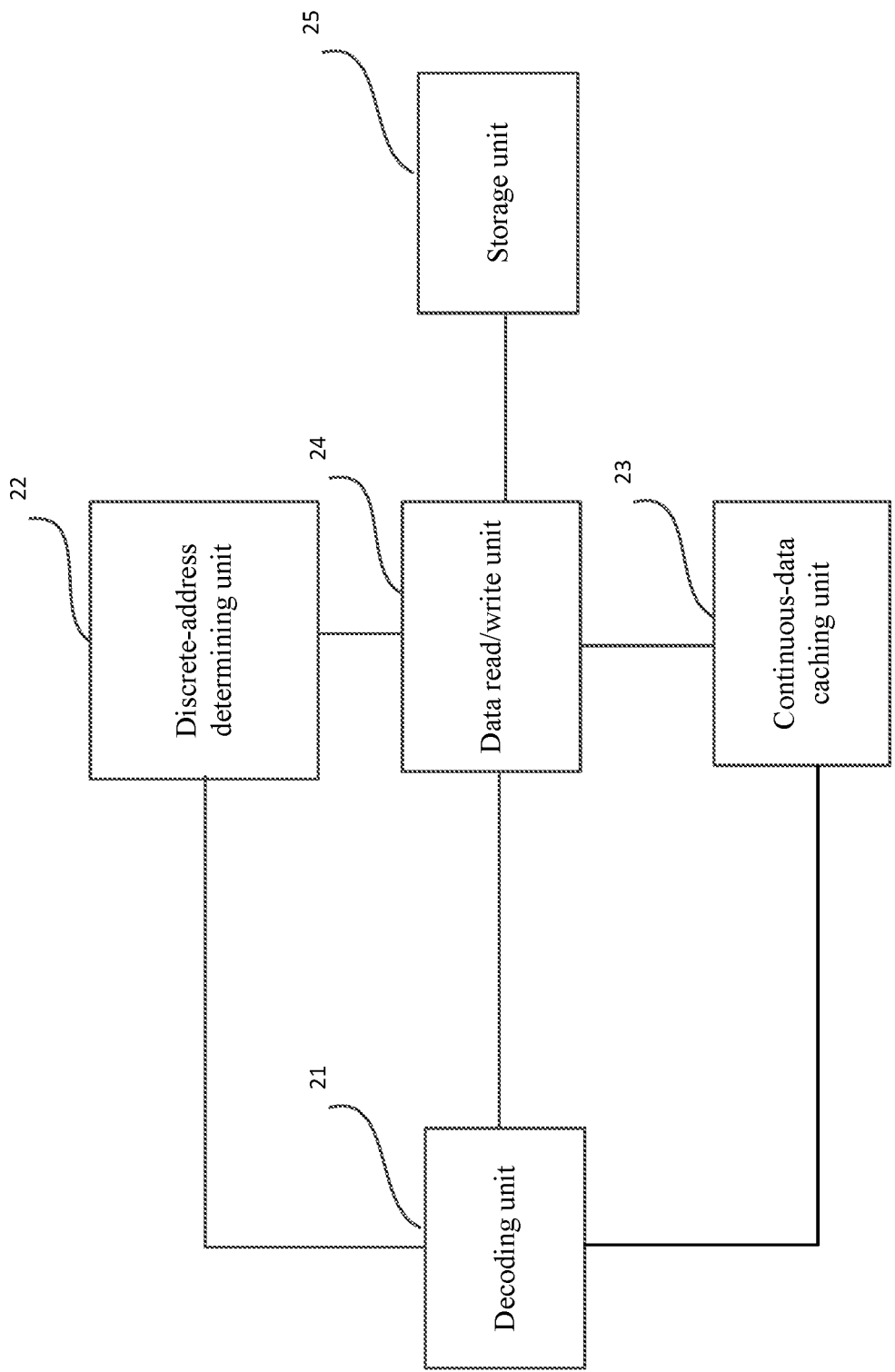
FIG. 2 is a block diagram of a data processing apparatus, according to an embodiment of the present disclosure.

FIG. 2 is a block diagram of a data processing apparatus according to an embodiment of the present disclosure. As illustrated in FIG. 2, the apparatus includes a decoder (DEC) 21, a discrete-address determining unit 22, a continuous data buffer (CDB) 23, a data read/write unit 24, and a storage unit 25.

The decoder 21 may be configured to decode a received processing instruction to obtain a decoded processing instruction. The decoder 21 may be configured to determine the plurality of pieces of data corresponding to the processing instruction, the source data base addresses of the plurality of pieces of data, the destination data base addresses of the plurality of pieces of data, the data offset addresses of discrete data of the plurality of pieces of data, and the data sizes of continuous data of the plurality of pieces of data, where the source data of the plurality of pieces of data includes discrete data or continuous data. The decoding unit may be further configured to determine a first storage address of the continuous data according to a base address of the continuous data and a data size of the continuous data.

The discrete-address determining unit 22 is coupled with the decoder 21 and the data read/write unit 24. The discrete-address determining unit 22 may be configured to determine a second storage address of the discrete data according to a base address of the discrete data and a data offset address of the discrete data, and send the second storage address to the data read/write unit.

The continuous-data caching unit 23 is coupled with the decoder 21 and the data read/write unit 24. The continuous-data caching unit 23 may be configured to create a cache space for continuous data. The continuous-data caching unit 23 may be configured to cache continuous data of the first storage address into the cache space and send the continuous data to the data read/write unit. Alternatively, the continuous-data caching unit 23 may be configured to cache continuous data received from the data read/write unit into the cache space and send the continuous data to the first storage address.

The data read/write unit 24 is coupled with the storage unit 25, and may be configured to read discrete data from the storage unit according to the second storage address of the discrete data and send the read discrete data to the continuous-data caching unit. Alternatively, the data read/write unit 24 may be configured to receive continuous data from the continuous-data caching unit and write the received continuous data into the storage unit according to a storage address of discrete data.

The data processing apparatus of embodiments of the present disclosure may realize a vector address access (VAA) function, and may support a corresponding functional instruction, such as a gather load instruction, a scatter store instruction, and a vector extension instruction. The gather load instruction is used to aggregate contents of a set of discrete addresses into a continuous data vector. The scatter store instruction is used to store a continuous data vector to a set of discrete addresses. The vector extension instruction is for implementing extension and storage of a continuous data vector according to an extension parameter. The count and type of instructions supported by the apparatus are not limited by the present disclosure.

For example, the decoder 21 may obtain a processing instruction to be decoded from an upstream instruction issue queue (ISQ) of the apparatus, and decode the processing instruction to obtain a decoded processing instruction. The decoded processing instruction may include an operation code and an operation domain, where the operation code indicates a processing type of the processing instruction, and the operation domain indicates data to be processed and a data parameter.

In a possible implementation, the decoder 21 may be configured to determine, according to an operation domain, a plurality of pieces of data corresponding to a decoded processing instruction and data parameters of the plurality of pieces of data, such as the source data base addresses of the plurality of pieces of data, the destination data base addresses of the plurality of pieces of data, the data offset addresses of discrete data of the plurality of pieces of data, and the data sizes (single point data size) of continuous data of the plurality of pieces of data. The source data of the plurality of pieces of data includes discrete data or continuous data. If the processing instruction is a data transfer instruction, the source data of the plurality of pieces of data is discrete data, and the destination data of the plurality of pieces of data is continuous data. If the decoded processing instruction is a scatter store, the source data of the plurality of pieces of data is continuous data, and the destination data of the plurality of pieces of data is discrete data. The decoder 21 may be configured to store the count of pieces of data (single point data number) to be processed and data parameter of each piece of data, and send a base address of discrete data and a data offset address of the discrete data to the discrete-address determining unit 22.

In a possible implementation, the discrete-address determining unit 22 may be configured to determine a second storage address of discrete data according to the base address of a received discrete data and the data offset address of the received discrete data. The data offset address of the discrete data may include an offset value, an offset vector base address and an offset size stored in an external memory (such as a RAM). The discrete-address determining unit 22 may be configured to read, according to the offset vector base address and the offset size, an offset of each piece of discrete data from the external memory (such as a RAM) through a bus port share. The discrete-address determining unit 22 may be configured to calculate a second storage address of the discrete data in the storage unit 25 according to the offset vector base address of the discrete data stored in the storage unit 25 and the offset value of the discrete data stored in the storage unit 25. The discrete-address determining unit 22 may be configured to send a second storage address order of each piece of discrete data to the data read/write unit 24.

In a possible implementation, according to a second storage address of discrete data, the data read/write unit 24 may be configured to read the discrete data from the storage unit 25 or write the discrete data into the storage unit 25. For example, if the processing instruction is a data transfer instruction, the data read/write unit 24 may read each piece of discrete data from the storage unit 25 sequentially according to a second storage address, and send the read discrete data to the continuous-data caching unit 23. If the processing instruction is a scatter store, the data read/write unit 24 may receive continuous data sent by the continuous-data caching unit 23, and write the received continuous data into the storage unit 25 according to a second storage address of discrete data.

In a possible implementation, the storage unit 25 may be a VAA cache (VAC) that implements vector address access, and the type of the storage unit 25 is not limited in the present disclosure.

In a possible implementation, the decoder 21 may be further configured to determine a first storage address of continuous data according to a base address of the continuous data and a data size of the continuous data, and send the first storage address to the continuous-data caching unit 23. The first storage address may be an address of continuous data stored in an external memory (such as a RAM).

$$\text{Single Point Continuous Addr}[n] = \text{Continuous Data Base Address} + (n-1) * \text{Single Point Data Size} \quad (1).$$

In formula (1), Single Point Continuous Addr[n] represents a data address of the $n^{th}$ continuous data, Continuous Data Base Address represents a base address of the continuous data, and Single Point Data Size represents a data size of the continuous data. For example, if the base address is Addr1[0,3], the size of single data is 4 bits, and n is 3, a data address of the $3^{rd}$ continuous data is determined to be Addr1[8,11].

In a possible implementation, the continuous-data caching unit 23 may be configured to create a cache space for continuous data. The continuous-data caching unit 23 may be configured to cache continuous data of a first storage address into the cache space and send the continuous data to the data read/write unit. Alternatively, the continuous-data caching unit 23 may be configured to cache continuous data received from the data read/write unit into the cache space and send the continuous data to a first storage address.

For example, if the processing instruction is a data transfer instruction, the data read/write unit 24 may send the read discrete data to the continuous-data caching unit 23, and the continuous-data caching unit 23 may cache the discrete data to be continuous data in the cache space and send the cached continuous data to a first storage address. If the processing instruction is a scatter store, the continuous-data caching unit 23 may read continuous data from a first storage address of an external memory (such as a RAM) through bus port share, cache the read continuous data into the cache space, and send the continuous data to the data read/write unit 24 sequentially, so that the data read/write unit 24 may store each piece of continuous data to a second storage address of the storage unit 25, to obtain discrete data.

According to embodiments of the present disclosure, the processing instruction may be decoded and executed. Discrete data may be transferred to a continuous data address, or continuous data may be stored to multiple discrete data addresses. As such, a vector computation of discrete data and vector data restoration after the vector computation may be implemented, which may simplify a processing process, thereby reducing data overhead.

Figure 3:
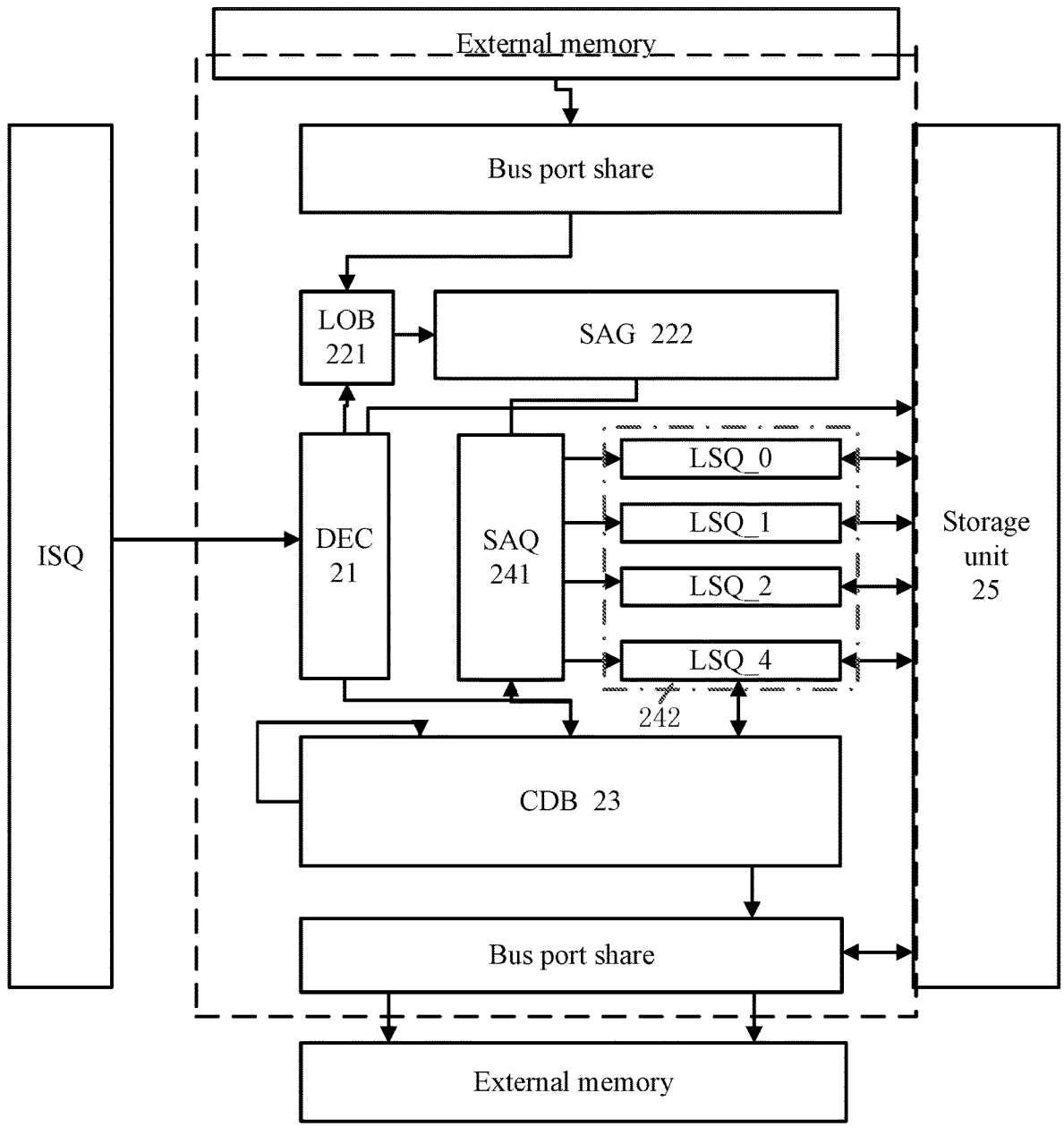
FIG. 3 is a block diagram of a data processing apparatus, according to an embodiment of the present disclosure.

FIG. 3 is a block diagram of a data processing apparatus according to an embodiment of the present disclosure. As illustrated in FIG. 3, in a possible implementation, the discrete-address determining unit 22 may include a load offset buffer 221 (LOB) and a scatter addr. generator 222 (SAG).

The load offset buffer 221 may be configured to determine, for each piece of discrete data, an offset storage address according to an offset size and an offset vector base address of the discrete data, and read an offset of each piece of discrete data from the offset storage address of the discrete data.

The scatter addr. generator 222 may be configured to determine, for each piece of discrete data, a second storage address according to an offset of the discrete data and a base address of the discrete data, and send the second storage address to the data read/write unit.

For example, the load offset buffer 221 may cache a base address of discrete data and a data offset address of the discrete data that are sent by the decoder 21. The load offset buffer 221 may read an offset of each piece of discrete data from an external memory (such as a RAM) through bus port share according to an offset vector base address and an offset size in the data offset address. The load offset buffer 221 may cache the read offset, and sequentially send a base address and an offset of each piece of discrete data stored in the storage unit 25 to the scatter addr. generator 222.

In a possible implementation, the scatter addr. generator 222 may be configured to calculate a second storage address of each piece of discrete data in sequence according to an offset and a base address of each piece of discrete data.

$$\text{Single Point Scatter Addr}[n]=\text{Scatter Data Base Address}+\text{Offset Address}[n] \quad (2).$$

In formula (2), Single Point Scatter Addr[n] represents a second storage address of the $n^{th}$ discrete data, Scatter Data Base Address represents a base address of the discrete data, and Offset Address[n] represents an offset of the $n^{th}$ discrete data. For example, if the base address is Addr2[4] and the offset is [24, 27], the second storage address of the $n^{th}$ discrete data is determined to be Addr2[28, 31].

In a possible implementation, the scatter addr. generator 222 may be configured to send a calculated second storage address of discrete data to the data read/write unit 24 in order, so that the data read/write unit 24 may read or write the discrete data.

In this way, a second storage address of each piece of discrete data may be determined.

As illustrated in FIG. 3, in a possible implementation, the data read/write unit 24 may include a scatter addr. queue (SAQ) subunit 241 and a load store queue (LSQ) subunit 242.

The scatter addr. queue subunit 241 may be configured to receive and store a second storage address of discrete data.

The load store queue subunit 242 may be configured to read the discrete data from the storage unit according to the second storage address of the discrete data, and send the read discrete data to the continuous-data caching unit. Alternatively, the load store queue subunit 242 may be configured to receive continuous data from the continuous-data caching unit, and write the received continuous data into the storage unit according to a storage address of discrete data.

For example, the scatter addr. queue subunit 241 may receive and cache a second storage address of each piece of discrete data to form a discrete address queue, and establish a correspondence between each piece of discrete data and a cache address of a cache space in the continuous-data caching unit 23, so that the read discrete data may be placed correspondingly in the cache space.

In a possible implementation, the load store queue subunit 242 may include multiple load store queues, for example, there are four load store queues in FIG. 3, which may increase the speed of reading or writing of discrete data. The scatter addr. queue subunit 241 may be configured to send a second storage address of each piece of discrete data to a respective load store queue in order. When reading discrete data, each load store queue may read discrete data from the storage unit respectively, and send the read discrete data to a corresponding cache address of the cache space. When writing discrete data, each load store queue may receive continuous data of each cache address in the cache space respectively, and write each piece of continuous data to a corresponding second storage address of the storage unit.

In this way, discrete data may be read or written to complete a corresponding processing instruction.

The process of executing various processing instructions by the data processing apparatus will be described below.

In a possible implementation, the processing instruction may include a data transfer instruction. If the decoded processing instruction is a data transfer instruction, the source data of the plurality of pieces of data is discrete data, the destination data of the plurality of pieces of data is continuous data, the base address of the source data is a base address of the discrete data, and the base address of the destination data is a base address of the continuous data. The data read/write unit may be configured to: read discrete data from the storage unit according to a storage address of the discrete data; and send the read discrete data to the continuous-data caching unit. The continuous-data caching unit may be configured to: cache discrete data received from the data read/write unit into a cache space to obtain continuous data; and send continuous data in the cache space to a first storage address of an external memory when the continuous data in the cache space reaches a first preset quantity.

For example, the data transfer instruction (gather load) is used to aggregate contents of a set of discrete addresses into a continuous data vector. If the processing instruction decoded by the decoder 21 is the data transfer instruction, source data is discrete data, and destination data is continuous data. On the one hand, the decoder 21 may store the count of pieces of discrete data, and may send a base address of discrete data and a data offset address of the discrete data to the discrete-address determining unit 22, so that the discrete-address determining unit 22 may calculate a second storage address of each piece of discrete data, and sequentially send the second storage address to the data read/write unit 24. On the other hand, the decoder 21 may determine a first storage address of continuous data according to a base address of the continuous data and a data size of the continuous data, and send the first storage address to the continuous-data caching unit 23. The specific processing process will not be repeated herein.

In a possible implementation, the data read/write unit 24 may be configured to allocate a buffer ID for each discrete data point in an SAQ according to a sequential allocatable cache pointer of the continuous-data caching unit 23, so that a correspondence between second storage addresses of pieces of discrete data and buffer IDs may be established. Then, the scatter addr. queue subunit 241 may be configured to send a second storage address of each piece of discrete data to a respective load store queue sequentially. Each load store queue may be configured to read each piece of discrete data from the storage unit 25 according to the second storage address respectively, and send the read discrete data to a cache space of the continuous-data caching unit 23.

In a possible implementation, the continuous-data caching unit 23 may be configured to sequentially cache each piece of discrete data into a cache space according to a buffer ID of each piece of discrete data to form continuous data (which may be called vector data). When the continuous data in the cache space reaches a first preset quantity, the continuous data in the cache space is sent to a first storage address of an external memory through bus port share. The first preset quantity herein may be equal to the count of pieces of continuous data capable of being cached in the cache space; in other words, the continuous data is sent to the first storage address of the external memory once the cache space is full. The first preset quantity herein may also be smaller than the count of pieces of continuous data capable of being cached in the cache space, which is not limited in the present disclosure.

On condition that all discrete data is sent to a first storage address, vector data of a preset length may be obtained, and so execution of the data transfer instruction is completed.

Furthermore, the vector data may be further processed according to a data computation instruction, such as a four arithmetic computation based on at least two pieces of vector data, or a difference computation between two pieces of vector data.

In this way, in an application scenario (such as image recognition) where a large number of paired discrete data points need to be computed, discrete data may be transferred to a continuous address space according to a data transfer instruction to aggregate into vector data for vector computation. As such, computation of discrete data points may be converted into vector computation, which may simplify a processing process, thereby reducing data overhead.

In a possible implementation, the processing instruction may include a scatter store. If the decoded processing instruction is a scatter store, the source data of the plurality of pieces of data is continuous data, the destination data of the plurality of pieces of data is discrete data, the base address of the source data is a base address of the continuous data, and the base address of the destination data is a base address of the discrete data.

The continuous-data caching unit may be configured to:
read continuous data from an external memory according to a first storage address; cache the read continuous data into a cache space; and send continuous data in the cache space to the data read/write unit, when the continuous data in the cache space reaches a second preset quantity.

The data read/write unit may be configured to: receive continuous data from the continuous-data caching unit; and write the received continuous data into the storage unit according to a storage address of the discrete data.

For example, the scatter store is used to store a continuous data vector to a set of discrete addresses scatteredly. If the processing instruction decoded by the decoder 21 is the scatter store, source data is continuous data and destination data is discrete data. On the one hand, the decoder 21 may store the count of pieces of discrete data, and may send a base address of the discrete data and a data offset address of the discrete data to the discrete-address determining unit 22, so that the discrete-address determining unit 22 may calculate a second storage address of each piece of discrete data and sequentially send the second storage address to the data read/write unit 24. On the other hand, the decoder 21 may determine a first storage address of continuous data according to a base address of the continuous data and a data size of the continuous data, and send the first storage address to the continuous-data caching unit 23. The specific processing process will not be repeated herein.

In a possible implementation, the continuous-data caching unit 23 may be configured to create a cache space for continuous data. The continuous-data caching unit 23 may be configured to send a data read request to an external memory (such as a DRAM or a CT-RAM) through the bus port share according to a first storage address of continuous data, and sequentially backfill continuous data returned by the external memory into the cache space. When the continuous data in the cache space reaches a second preset quantity, the continuous-data caching unit 23 may be configured to send the continuous data in the cache space to the data read/write unit 24. The second preset quantity herein may be equal to the count of pieces of continuous data capable of being cached in the cache space; in other words, the continuous data is sent when the cache space is full. The second preset quantity herein may also be less than the count of pieces of continuous data capable of being cached in the cache space, which is not limited in the present disclosure.

In a possible implementation, the data read/write unit 24 may be configured to allocate a buffer ID for each discrete data point in an SAQ according to a sequential allocatable cache pointer of the continuous-data caching unit 23, so that a correspondence between second storage addresses of pieces of discrete data and buffer IDs (also known as an exponential index) may be established. Then, the scatter addr. queue subunit 241 may be configured to sequentially send a buffer ID and a second storage address of each piece of discrete data respectively to a load store queue (LSQ).

In a possible implementation, when the LSQ is ready to write data to the storage unit, data at a buffer ID (also called an exponential index) of discrete data to be written should have been sent (or backfilled) to the LSQ. In this case, the LSQ may write discrete data to a corresponding second storage address of the storage unit. In this way, discrete data is continuously written in sequence, to complete writing of all data. After all data is written to the storage unit, the storage unit 25 may further write discrete data into an external memory (such as a DRAM or a CT-RAM) through the bus port share.

In a possible implementation, the decoder 21 may be configured to read state information of the LSQ, the CDB, and the like to determine an execution state of a present instruction and determine whether execution of the present instruction is ended. After execution of a present scatter store is completed, the decoder 21 may further send a clean VAC operation to the storage unit (VAC) 25 to clear data in the storage unit and start to execute a new instruction.

In this way, pieces of data of vector data may be scatteredly stored to a discrete address space according to a scatter store, to obtain a plurality of pieces of discrete data. As such, in an application scenario (such as image recognition), after a vector computation on a large number of paired discrete data points is performed, a vector computed is scatteredly stored as discrete data points to obtain discrete processing results, which may simplify a processing process, thereby reducing data overhead.

In a possible implementation, the processing instruction may include a data transfer instruction. If the decoded processing instruction is a data transfer instruction, the source data of the plurality of pieces of data is discrete data, the destination data of the plurality of pieces of data is continuous data, the base address of the source data is a base address of the discrete data, and the base address of the destination data is a base address of the continuous data.

The decoding unit may be further configured to:
determine a transfer mode of the data transfer instruction if the decoded processing instruction is the data transfer instruction;
determine a base address of source data of a plurality of pieces of first data, a base address of destination data of the plurality of pieces of first data, a data offset address of the plurality of pieces of first data, an offset stride of a plurality of pieces of second data, and a destination base address stride of the plurality of pieces of second data in an operation domain of the data transfer instruction if the transfer mode of the data transfer instruction is a multi-vector transfer mode;
determine a third storage address of the plurality of pieces of first data according to the base address of the destination data of the plurality of pieces of first data and a data size of the continuous data; and
determine a fourth storage address of the plurality of pieces of second data according to the third storage address of the plurality of pieces of first data and the destination base address stride of the plurality of pieces of second data.

The discrete-address determining unit may be further configured to:
determine a fifth storage address of the plurality of pieces of first data according to a data offset address and a base address of the source data of the first data;
determine a sixth storage address of the plurality of pieces of second data according to a fifth storage address of first data and an offset stride of the second data; and
send the fifth storage address and the sixth storage address to the data read/write unit.

The data read/write unit may be further configured to:
read first data from the storage unit according to the fifth storage address and read second data from the storage unit according to the sixth storage address; and
send the read first data and the read second data to the continuous-data caching unit.

The continuous-data caching unit may be further configured to:
create a cache space for the plurality of pieces of first data and the plurality of pieces of second data respectively;
cache first data and second data received from the data read/write unit into the cache space respectively; and
send continuous data in the cache space to the third storage address of an external memory when first data in the cache space reaches a third preset quantity, and send continuous data in the cache space to the fourth storage address of the external memory when second data in the cache space reaches the third preset quantity.

For example, the transfer mode of the data transfer instruction that may be set in advance may include a single vector transfer mode (for example, expressed as Mode0), a multi-vector transfer mode (for example, expressed as Mode1), and the like. In the single vector transfer mode, a data transfer instruction may be used to aggregate multiple discrete data points into one piece of vector data. In the multi-vector transfer mode, a data transfer instruction may be used to aggregate multiple discrete data points into at least two pieces of vector data. The transfer mode may be determined according to a field configured to indicate the transfer mode in an operation domain of the data transfer instruction, such as a field Mode0 or a field Mode1, which is not limited in the present disclosure.

When pairs or sets of discrete points are required to be transferred to perform a computation (such as a difference computation), since adjacent points are generally in a same cache line, a multi-vector transfer mode may be adopted, so that two or more data points may be obtained by fetching a data point once. Finally, two or more different vectors may be generated, which is conducive to performing a vector computation to obtain a final result (such as a difference vector).

In a possible implementation, if the decoded processing instruction is a data transfer instruction, the decoder 21 may be configured to determine a transfer mode of the data transfer instruction (for example, expressed as "gather load offset mode"). If the transfer mode of the data transfer instruction is a multi-vector transfer mode, the decoder 21 may be configured to determine a destination data address and a source data address of each data point to be transferred. The source data address herein represents present data storage addresses of multiple data points in a data storage space, which are multiple discrete data addresses. The destination data address herein represents a data address of a data storage space to which multiple data points are to be transferred, which is a continuous data address. The data storage space where the source data address is located and the data storage space where the destination data address is located may be the same or different, which is not limited in the present disclosure.

In a possible implementation, in a multi-vector transfer mode, at least two vectors may be obtained. The first vector is set as first vector data, and other vectors are set as second vector data (including at least one piece of vector data). The operation domain of the data transfer instruction may include a destination data base address, a data offset address, and a source data base address of the plurality of pieces of first data of the first vector data. The operation domain of the data transfer instruction may also include a destination base address stride and an offset stride of the plurality of pieces of second data corresponding to the second vector data.

On the one hand, the decoder 21 may store the count of pieces of discrete data, and may send a data offset address and a source data base address of the plurality of pieces of first data as well as an offset stride of the plurality of pieces of second data to the discrete-address determining unit 22, so that the discrete-address determining unit 22 may calculate a fifth storage address of each piece of first data in the storage unit 25 and a sixth storage address of each piece of second data in the storage unit 25 (in other words, discrete source addresses).

In a possible implementation, according to a data offset address (including an offset vector base address and an offset size) and a source data base address of each piece of first data, the load offset buffer 221 of the discrete-address determining unit 22 may be configured to read an offset of each piece of first data from an external memory (such as a RAM) through a bus port share. The load offset buffer 221 may be configured to cache the read offset, and send an offset and a base address of each piece of first data stored in the storage unit 25 to the scatter addr. generator 222.

In a possible implementation, the scatter addr. generator 222 may be configured to sequentially calculate a fifth storage address of each piece of discrete data according to a base address and an offset of each piece of first data, and sequentially send the fifth storage addresses to the data read/write unit 24. On condition that two vectors are obtained by transferring, for the $n^{th}$ first data ($1 \le n \le N$, N is the count of pieces of first data), a fifth storage address may be expressed as formula (3).

$$\text{Single Point Src Addr}[2n]=\text{Source Data Base Address}+\text{Offset Address}[n] \quad (3).$$

In formula (3), Single Point Src Addr[2n] represents a fifth storage address of the $n^{th}$ first data, Source Data Base Address represents a base address of the first data, and Offset Address[n] represents an offset of the $n^{th}$ first data. The base address for example is Addr3[15], and the offset for example is [24,27], the fifth storage address of the $n^{th}$ first data is determined to be Addr3[39,42].

In a possible implementation, in a multi-vector transfer mode, on the basis of a fifth storage address of first data, the scatter addr. generator 222 may be configured to obtain, according to an offset stride, a sixth storage address of the second data corresponding to the first data directly.

$$\text{Single Point Src Addr}[2n+1]=\text{Source Data Base Address}+\text{Offset Address}[n]+\text{Offset Stride} \quad (4).$$

In formula (4), Single Point Src Addr[2n+1] represents a sixth storage address of second data corresponding to the $n^{th}$ first data. The fifth storage address of the $n^{th}$ first data for example is Addr3[39,42] and an offset stride for example is 8 bits, the sixth storage address of the n$^{th}$ second data is determined to be Addr3[47, 50].

In a possible implementation, when it is necessary to read multiple sets of second data to form multiple second vectors, an offset stride may take various values. For example, the offset stride includes 4 bits, 8 bits, 12 bits, and the like. In this way, a sixth storage address of each set of second data may be determined respectively according to different offset strides. Those skilled in the art may set the count and value of the offset stride according to actual needs, which is not limited in the present disclosure.

In this way, according to a storage address of first data and an offset stride, a corresponding storage address of second data may be determined directly, so that two or more data points may be obtained by one reading, which allows instruction to read a relatively large number of data according to a relatively small number of addresses (for example, one hundred data points may be read according to offset vector base addresses of fifty data points), thereby significantly reducing data overhead.

In a possible implementation, the scatter addr. queue subunit 241 of the data read/write unit 24 may be configured to receive and cache a fifth storage address and a sixth storage address, and establish a correspondence between each piece of discrete data and a cache address of a cache space in the continuous-data caching unit 23, so that read discrete data may be placed in a corresponding cache space. For example, according to a sequential allocatable cache pointer of the continuous-data caching unit 23, a buffer ID is allocated for each discrete data point in the SAQ, to establish a correspondence between second storage addresses of pieces of discrete data and buffer IDs.

In a possible implementation, the scatter addr. queue subunit 241 may be configured to sequentially send each fifth storage address and each sixth storage address respectively to a load store queue. Each load store queue may be configured to read discrete first data and discrete second data from the storage unit respectively, and send read discrete data to corresponding cache addresses of cache space in order.

The load store queue may first read first data and then read second data, or may read the first data and the second data at the same time, which is not limited in the present disclosure.

On the other hand, the decoder 21 may determine, according to a data size and a destination data base address of each piece of first data as well as a destination base address stride of each piece of second data, a third storage address of each piece of first data in an external memory and a fourth storage address (in other words, continuous destination addresses) of each piece of second data in the external memory. The decoder 21 may send the third storage address and the fourth storage address to the continuous-data caching unit 23.

In a possible implementation, the operation domain of the data transfer instruction may include a destination data base address, a single point data size, a destination base address stride, and the like. Since a destination data address is a continuous data address, the destination data address (referred to as a third storage address) of each piece of first data may be determined directly in order according to a data size of each piece of first data and a serial number of each piece of first data. On condition that two vectors are obtained by transferring, a third storage address may be expressed as formula (5).

Single Point Dest Addr[2*n*]=Destination Data Base
  Address+(*n*−1)*Single Point Data Size       (5).

In formula (5), Single Point Dest Addr[2n] represents a third storage address of the n$^{th}$ first data. For example, the destination data base address is Addr4[0,3], the size of single data is 4 bits, and n is 3, a third storage address of the 3$^{rd}$ first data is determined to be Addr4[8,11].

In a multi-vector transfer mode, on the basis of a third storage address of first data, a corresponding fourth storage address of second data may be obtained directly according to a destination base address stride. On condition that two vectors are obtained by transferring, a fourth storage address may be expressed as formula (6).

Single Point Dest Addr[2*n*+1]=Destination Data
  Base Address+(*n*−1)*Single Point Data Size+
  Destination Base Address Stride       (6).

In formula (6), Single Point Dest Addr[2n+1] represents a fourth storage address of second data corresponding to the n$^{th}$ first data. For example, in a case that a third storage address of the n$^{th}$ first data determined according to a destination data base address and a data size is Addr4[8,11], and the destination base address stride is 48 bits, a fourth storage address of the n$^{th}$ second data is determined to be Addr4[56,59].

In a possible implementation, when it is necessary to read multiple sets of second data to form multiple second vectors, a destination base address stride may take various values. For example, the destination base address stride includes 48 bits, 96 bits, and the like to store the plurality of pieces of vector data respectively. In this way, a fourth storage address of each set of second data may be determined respectively according to different destination base address strides. Those skilled in the art may set the count and value of the destination base address stride according to actual needs, which is not limited in the present disclosure.

In this way, according to a destination data address of the first data and a destination base address stride of the first data, a corresponding destination data address of the second data may be determined directly, and the destination data address of the second data may store each piece of data of at least two pieces of vector data, thereby significantly reducing data overhead.

In a possible implementation, the continuous-data caching unit 23 may be configured to respectively create a cache space for the plurality of pieces of first data and the plurality of pieces of second data. When receiving first data and second data from the data read/write unit, the continuous-data caching unit 23 may be configured to sequentially cache each piece of first data and each piece of second data into the cache space according to a buffer ID of each piece of first data and a buffer ID of each piece of second data, to form continuous vector data. Once first data in the cache space reaches a third preset quantity, the continuous-data caching unit 23 may be configured to send continuous data in the cache space to a third storage address of an external memory. Once second data in the cache space reaches the third preset quantity, the continuous-data caching unit 23 may be configured to send continuous data in the cache space to a fourth storage address of the external memory. The third preset quantity herein may be equal to the count of pieces of continuous data capable of being cached in the cache space; in other words, continuous data is sent to the third storage address or the fourth storage address of the external memory once the cache space is full. The third preset quantity herein may also be smaller than the count of pieces of continuous data capable of being cached in the cache space, which is not limited in the present disclosure.

In this way, each piece of first data and each piece of second data are transferred in sequence, to obtain N pieces of continuous first data stored at the third storage address and N pieces of continuous second data stored at the fourth storage address, which may realize the process of aggregating discrete first data into first vector data and aggregating discrete second data into second vector data. Therefore, data transfer is realized, which may provide a data basis for subsequent processing.

In a possible implementation, after multi-vector data transfer is completed, the plurality of pieces of vector data may be further processed according to a data computation instruction, such as a four arithmetic computation of at least two pieces of vector data, or a difference computation between two pieces of vector data.

In this way, pairs or sets of discrete data may be transferred to multiple continuous address space according to a data transfer instruction of a multi-vector transfer mode, to be respectively aggregated into plurality of pieces of vector data. As such, in an application scenario (such as in image recognition) where a large number of pairs (or sets) of discrete data points need to be computed, the plurality of pieces of vector data involved in the computation may be obtained directly according to an instruction, and computation of discrete data points may be converted into a vector computation, which may simplify a processing process, thereby reducing data overhead.

In a possible implementation, the processing instruction may include a vector extension instruction. If the decoded processing instruction is a vector extension instruction, the source data of the plurality of pieces of data is continuous data, the destination data of the plurality of pieces of data is continuous data, the base address of the source data is a base address of the continuous data, and the base address of the destination data is a base address of the continuous data.

The decoding unit is further configured to:
determine a base address of source data of a plurality of pieces of third data, a base address of destination data of a plurality of pieces of fourth data, a data size, and an extension parameter in an operation domain of the vector extension instruction when the decoded processing instruction is the vector extension instruction;
determine a seventh storage address of the plurality of pieces of third data according to a data size and the base address of the source data of the plurality of pieces of third data, and send the seventh storage address to the continuous-data caching unit.

The continuous-data caching unit may be further configured to:
create a cache space for the plurality of pieces of third data and the plurality of pieces of fourth data respectively;
read the plurality of pieces of third data from an external memory according to the seventh storage address, and cache the plurality of pieces of third data into the cache space;
send the plurality of pieces of cached third data to the decoding unit when the third data in the cache space reaches a fourth preset quantity.

The decoding unit may be further configured to:
extend the plurality of pieces of third data to obtain the plurality of pieces of fourth data according to the plurality of pieces of third data and the extension parameter from the continuous-data caching unit;
determine an eighth storage address of the plurality of pieces of fourth data according to a data size and the base address of the destination data of the plurality of pieces of fourth data, and send the plurality of pieces of fourth data and the eighth storage address to the continuous-data caching unit.

The continuous-data caching unit may be further configured to:
cache the plurality of pieces of fourth data into the cache space;
send the plurality of pieces of cached fourth data to the eighth storage address of the external memory when the fourth data in the cache space reaches a fifth preset quantity.

For example, a vector extension instruction is used to extend and store a continuous data vector according to an extension parameter. If the processing instruction decoded by the decoder 21 is the vector extension instruction, both the source data (may be called third data) and the destination data (may be called fourth data) are continuous data. In this case, base addresses of source data of the plurality of pieces of third data, base addresses of destination data of the plurality of pieces of fourth data, a data size, and an extension parameter in an operation domain of the vector extension instruction may be determined.

In a possible implementation, the decoder 21 may be configured to determine a seventh storage address of the plurality of pieces of third data in an external memory according to data sizes and base addresses of source data of the plurality of pieces of third data, and send the seventh storage address to the continuous-data caching unit.

In a possible implementation, the continuous-data caching unit 23 may be configured to respectively create a cache space for the plurality of pieces of third data and the plurality of pieces of fourth data. In addition, the continuous-data caching unit 23 may be configured to read the plurality of pieces of third data from an external memory according to a seventh storage address, and cache the plurality of pieces of third data into the cache space. The continuous-data caching unit 23 may be configured to send the plurality of pieces of cached third data to the decoding unit once the third data in the cache space reaches a fourth preset quantity. The fourth preset quantity herein may be equal to the count of pieces of continuous data capable of being cached in the cache space; in other words, the continuous data is sent to the decoding unit once the cache space is full. The fourth preset quantity herein may also be less than the count of pieces of continuous data capable of being cached in the cache space, which is not limited in the present disclosure.

In a possible implementation, the decoder 21 may be configured to extend the plurality of pieces of third data according to the plurality of pieces of third data and an extension parameter from the continuous-data caching unit 23 to obtain the plurality of pieces of fourth data.

In a possible implementation, there are M pieces of third data, and the extension parameter includes M extension parameter bits corresponding to the M pieces of third data, where M is an integer greater than 1.

Extending the plurality of pieces of third data according to the plurality of pieces of third data and the extension parameter from the continuous-data caching unit to obtain the plurality of pieces of fourth data includes:
determining $k_m$ pieces of data in the $m^{th}$ data position according to the $m^{th}$ third data and the $m^{th}$ extension parameter bit corresponding to the $m^{th}$ third data, where $1 \leq m \leq M$, and $k_m \geq 0$;
obtaining the plurality of pieces of fourth data according to data in M data positions.

For example, the extension parameter may include M extension parameter bits, which respectively represent the number of times $k_m$ of copying M pieces of third data. If M=5, the extension parameter may be expressed as [1,2,0,3,1], which represents that five pieces of third data are copied once, twice, zero times, three times, and once respectively.

In a possible implementation, for the $m^{th}$ third data (1≤m≤M), the $m^{th}$ extension parameter bit corresponding to the $m^{th}$ third data is $k_m$ ($k_m$≥0), then the $m^{th}$ data position is determined to have $k_m$ pieces of the $m^{th}$ third data. In this way, M pieces of third data may be extended respectively, to determine data in M data positions. As an example, M pieces of third data are [A, B, C, D, E], and an extension parameter is [1, 2, 0, 3, 1], after extension, the plurality of pieces of fourth data obtained are [A, B, B, D, D, D, E] to form new vector data. The count of pieces of fourth data may be different from the count of pieces of third data.

It should be understood that, the extension parameter may further include other extension contents (for example, a value of each data point is enlarged or reduced by a certain multiple). The extension parameter may also be expressed in other manners. The extension parameter may be set by those skilled in the art according to actual needs, which is not limited in the present disclosure.

In a possible implementation, the decoder 21 may be configured to determine an eighth storage address of the plurality of pieces of fourth data according to data sizes and base addresses of destination data of the plurality of pieces of fourth data. The decoder 21 may be configured to send the plurality of pieces of fourth data and the eighth storage address to the continuous-data caching unit.

In a possible implementation, the continuous-data caching unit 23 may be configured to cache the plurality of pieces of fourth data into the cache space. The continuous-data caching unit 23 may be configured to send the plurality of pieces of cached fourth data to an eighth storage address of an external memory once the fourth data in the cache space reaches a fifth preset quantity. The fifth preset quantity herein may be equal to the count of pieces of continuous data capable of being cached in the cache space; in other words, the continuous data is sent to the external memory once the cache space is full. The fifth preset quantity herein may also be less than the count of pieces of continuous data capable of being cached in the cache space, which is not limited in the present disclosure.

In this way, a vector may be extended according to a vector extension instruction. As such, in an application scenario (such as image recognition) where extension processing of vector data is required, an original vector may be extended to a new vector, and the new vector may be stored in a continuous address space, which may simplify a processing process, thereby reducing data overhead.

It needs to be noted that, for the sake of simplicity, the foregoing apparatus embodiments are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the embodiments described in the specification are optional embodiments, and the actions and units/modules involved are not necessarily essential to the present disclosure.

It should be understood that, the foregoing apparatus embodiments are merely illustrative, and the apparatus of the present disclosure may be implemented in other manners. For example, the division of the unit/module in the foregoing embodiments is only a logical function division, and there may be other manners of division during actual implementation. For instance, multiple units, modules, or components may be combined or may be integrated into another system, or some features may be ignored, omitted, or not performed.

In addition, unless indicated otherwise, functional units/modules in various embodiments of the present disclosure may be integrated into one unit/module, or each unit/module may be physically present alone, or two or more units/modules may be integrated into one unit/module. The above-mentioned integrated unit/module may be implemented in the form of hardware or a software program module.

If the integrated unit/module is implemented in the form of hardware, the hardware may be a digital circuit, an analog circuit, and the like. The physical realization of a hardware structure includes, but is not limited to, a transistor, a memristor, and the like. Unless specified otherwise, the artificial intelligence processor may be any appropriate hardware processors, such as a CPU, GPU, FPGA, DSP, and ASIC (Application specific integrated circuit). Unless specified otherwise, the storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), and a hybrid memory cube, and the like.

The integrated unit/module may be stored in a computer readable memory when it is implemented in the form of a software program module and is sold or used as a separate product. Based on such understanding, the technical solutions of the present disclosure essentially, or the part of the technical solutions that contributes to the related art, or all or part of the technical solutions, may be embodied in the form of a software product. The software product is stored in a memory and includes instructions for causing a computer device (which may be a personal computer, a server, or a network device, and the like.) to perform all or part of the operations of the method described in the various embodiments of the present disclosure. The memory may include various medium capable of storing program codes, such as a USB flash disk, a read-only memory (ROM), a RAM, a removable hard disk, a magnetic disk, and a compact disc (CD).

In a possible implementation, an artificial intelligence chip is further provided. The artificial intelligence chip includes the above data processing apparatus.

In a possible implementation, an electronic device is further provided. The electronic device includes the above artificial intelligence chip.

In a possible implementation, a board card is further provided. The board card includes a storage component, an interface apparatus, a control component, and the above artificial intelligence chip. The artificial intelligence chip is coupled with the storage component, the control component, and the interface apparatus. The storage component is configured to store data. The interface apparatus is configured to implement data transmission between the artificial intelligence chip and an external device. The control component is configured to monitor a state of the artificial intelligence chip.

Figure 4:
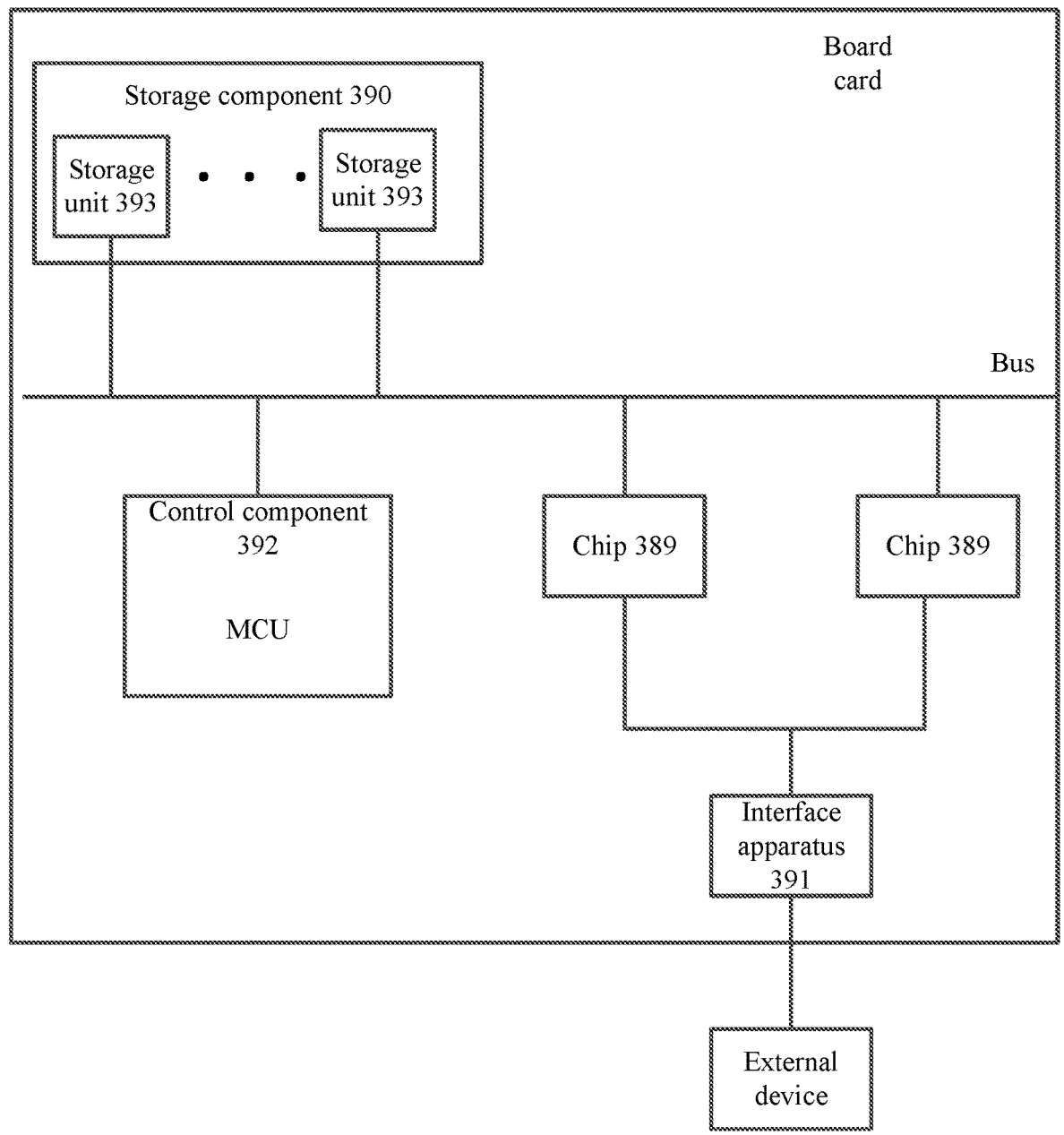
FIG. 4 is a structural block diagram of a board card, according to an embodiment of the present disclosure.

FIG. 4 is a structural block diagram of a board card according to an embodiment of the present disclosure. Referring to FIG. 4, the board card may include other supporting components in addition to the chip 389 described above. The supporting components include, but are not limited to, a storage component 390, an interface apparatus 391, and a control component 392.

The storage component 390 is coupled with the artificial intelligence chip via a bus, and is configured to store data. The storage component may include multiple sets of storage units 393. Each set of storage units is coupled with the artificial intelligence chip via the bus. It may be understood that, each set of storage units may be a double data rate (DDR) synchronous dynamic random access memory (SDRAM).

DDR may double a speed of an SDRAM without increasing a clock rate. DDR allows data to be read on rising and falling edges of a clock pulse. A speed of DDR is twice that of a standard SDRAM. In an embodiment, the storage component may include four sets of storage units. Each set of storage units may include multiple DDR4 particles (chips). In an embodiment, the artificial intelligence chip may include four 72-bit DDR4 controllers. For a 72-bit DDR4 controller, 64 bits are used for data transmission, and 8 bits are used for ECC (error checking and correcting) parity. It may be understood that, if a DDR4-3200 particle is used in each set of storage units, a theoretical bandwidth of data transmission may reach 25600 MB/s.

In an embodiment, each set of storage units may include multiple double data rate synchronous dynamic random access memories arranged in parallel. DDR allows data to be transmitted twice in a clock cycle. A controller configured to control the DDR is set in the chip, and the controller is used to control data transmission and data storage of each storage unit.

The interface apparatus is electrically connected with the artificial intelligence chip. The interface apparatus is configured to implement data transmission between the artificial intelligence chip and an external device (such as a server or a computer). In an embodiment, the interface apparatus may be a standard PCIe interface. As an example, data to be processed is transferred from a server to the chip through a standard PCIe interface to realize data transfer. If a PCIe 3.0×16 interface is used for transmission, a theoretical bandwidth may reach 16000 MB/s. In another embodiment, the interface apparatus may also be other interfaces, and the present disclosure does not limit specific manifestations of the above mentioned other interfaces, as long as an interface unit may realize a transfer function. In addition, a calculation result of the artificial intelligence chip is still transmitted back to an external device (such as a server) through the interface apparatus.

The control component is electrically connected with the artificial intelligence chip. The control component is configured to monitor a state of the artificial intelligence chip. As an example, the artificial intelligence chip is electrically connected with the control component through an SPI (serial peripheral interface). The control component may include a micro controller unit (MCU). For example, the artificial intelligence chip may include multiple processing chips, multiple processing cores, or multiple processing circuits, and may drive multiple loads. Therefore, the artificial intelligence chip may be in different working states such as a multi-load state and a light-load state. The control component may realize regulation and control of working states of multiple processing chips, multiple processing, and/or multiple processing circuits in the artificial intelligence chip.

In a possible implementation, an electronic device is provided. The electronic device includes the above artificial intelligence chip. The electronic device may include a data processing apparatus, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment. The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In the foregoing embodiments, the description of each embodiment has its own emphasis. For the parts not described in detail in an embodiment, reference may be made to related descriptions in other embodiments. The technical features of the foregoing embodiments may be combined arbitrarily. For the sake of concise description, not all possible combinations of the various technical features in the foregoing embodiments are described. However, as long as there is no contradiction in a combination of these technical features, this combination should be considered as falling within the scope of the specification.

The foregoing may be better understood according to the following articles.

Article A1.

A data processing apparatus, comprising a decoding unit, a discrete-address determining unit, a continuous-data caching unit, a data read/write unit, and a storage unit; wherein the decoding unit is configured to decode a processing instruction received to obtain a processing instruction decoded, and determine a plurality of pieces of data corresponding to the processing instruction, a base address of source data of the plurality of pieces of data, a base address of destination data of the plurality of pieces of data, a data offset address of discrete data of the plurality of pieces of data, and a data size of continuous data of the plurality of pieces of data; the source data of the plurality of pieces of data comprises the discrete data or the continuous data; the decoding unit is further configured to determine a first storage address of the continuous data according to a base address of the continuous data and the data size of the continuous data;

the discrete-address determining unit is coupled with the decoding unit and the data read/write unit, and is configured to determine a second storage address of the discrete data according to a base address of the discrete data and the data offset address of the discrete data, and send the second storage address to the data read/write unit;

the continuous-data caching unit is coupled with the decoding unit and the data read/write unit, and is configured to create a cache space for continuous data, cache continuous data of the first storage address into the cache space and send the continuous data to the data read/write unit, or cache the continuous data received from the data read/write unit into the cache space and send the continuous data to the first storage address; and the data read/write unit is coupled with the storage unit, and is configured to read the discrete data from the storage unit according to the second storage address of the discrete data and send the discrete data read to the continuous-data caching unit, or receive the continuous data from the continuous-data caching unit and write the continuous data received into the storage unit according to a storage address of the discrete data.

Article A2. The apparatus of A1,
wherein the data offset address includes an offset vector base address and an offset size, and the discrete-address determining unit includes:
  an offset load subunit configured to determine an offset storage address of each piece of discrete data according to the offset size and the offset vector base address of the discrete data, and read an offset of each piece of the discrete data from an offset storage address of each piece of the discrete data; and
  a discrete-address generation subunit configured to determine the second storage address of each piece of the discrete data according to the offset of each piece of the discrete data and the base address of the discrete data, and send the second storage address to the data read/write unit.

Article A3. The apparatus of A1 or A2, wherein the data read/write unit includes: a scatter addr. queue subunit configured to receive and store the second storage address of the discrete data; and a load store queue subunit configured to read the discrete data from the storage unit according to the second storage address of the discrete data and send the discrete data read to the continuous-data caching unit, or receive the continuous data from the continuous-data caching unit and write the continuous data received into the storage unit according to the storage address of the discrete data.

Article A4. The apparatus of any one of A1 to A3,
wherein the processing instruction includes a data transfer instruction, and if the processing instruction decoded is the data transfer instruction, the source data of the plurality of pieces of data is discrete data, the destination data of the plurality of pieces of data is continuous data, the base address of the source data is the base address of the discrete data, and the base address of the destination data is the base address of the continuous data, wherein
  the data read/write unit is configured to:
    read the discrete data from the storage unit according to the storage address of the discrete data; and
    send the discrete data read to the continuous-data caching unit; and
  the continuous-data caching unit is configured to:
    cache the discrete data received from the data read/write unit into the cache space to obtain the continuous data; and
    send the continuous data in the cache space to a first storage address of an external memory, once the continuous data in the cache space reaches a first preset quantity.

Article A5. The apparatus of any one of A1 to A3,
the processing instruction includes a scatter store instruction, and if the processing instruction decoded is the scatter store instruction, the source data of the plurality of pieces of data is the continuous data, the destination data of the plurality of pieces of data is the discrete data, the base address of the source data is a base address of the continuous data, and the base address of the destination data is the base address of the discrete data, wherein
  the continuous-data caching unit is configured to:
    read the continuous data according to a first storage address of an external memory;
    cache the continuous data read into the cache space; and
    send the continuous data in the cache space to the data read/write unit, once the continuous data in the cache space reaches a second preset quantity; and
  the data read/write unit is configured to:
    receive the continuous data from the continuous-data caching unit; and
    write the continuous data received into the storage unit according to the storage address of the discrete data.

Article A6. The apparatus of any one of A1 to A3,
wherein the processing instruction includes a data transfer instruction, and if the processing instruction decoded is the data transfer instruction, the source data of the plurality of pieces of data is the discrete data, the destination data of the plurality of pieces of data is the continuous data, the base address of the source data is the base address of the discrete data, and the base address of the destination data is the base address of the continuous data, wherein
  the decoding unit is further configured to:
    determine a transfer mode of the data transfer instruction if the processing instruction decoded is the data transfer instruction;
    determine a base address of source data of a plurality of pieces of first data, a base address of destination data of the plurality of pieces of first data, a data offset address of the plurality of pieces of first data, an offset stride of a plurality of pieces of second data, and a destination base address stride of the plurality of pieces of second data in an operation domain of the data transfer instruction if the transfer mode of the data transfer instruction is a multi-vector transfer mode;
    determine a third storage address of the plurality of pieces of first data according to the base address of the destination data of the plurality of pieces of first data and the data size of the continuous data; and
    determine a fourth storage address of the plurality of pieces of second data according to the third storage address of the plurality of pieces of first data and the destination base address stride of the plurality of pieces of second data;
  the discrete-address determining unit is further configured to:
    determine a fifth storage address of the plurality of pieces of first data according to the data offset address and the base address of source data of the plurality of pieces of first data;
    determine a sixth storage address of the plurality of pieces of second data according to the fifth storage address of the plurality of first data and an offset stride of the plurality of pieces of second data; and
    send the fifth storage address and the sixth storage address to the data read/write unit;
  the data read/write unit is further configured to:
    read the first data from the storage unit according to the fifth storage address and read the second data from the storage unit according to the sixth storage address; and
    send the first data read and the second data read to the continuous-data caching unit; and
  the continuous-data caching unit is further configured to:
    create a cache space for the plurality of pieces of first data and the plurality of pieces of second data respectively;
    cache the first data and the second data received from the data read/write unit into the cache space respectively; and
    send the continuous data in the cache space to a third storage address of an external memory once the first data in the cache space reaches a third preset quantity, and send the continuous data in the cache space to a fourth storage address of the external memory once the second data in the cache space reaches the third preset quantity.

Article A7. The apparatus of any one of A1 to A3, wherein the processing instruction includes a vector extension instruction, and if the processing instruction decoded is the vector extension instruction, the source data of the plurality of pieces of data is the continuous data, the destination data of the plurality of pieces of data is the continuous data, the base address of the source data is the base address of the continuous data, and the base address of the destination data is the base address of the continuous data, wherein the decoding unit is further configured to:
  determine a base address of source data of a plurality of pieces of third data, a base address of destination data of a plurality of pieces of fourth data, a data size of the plurality of pieces of fourth data, and an extension parameter of the plurality of pieces of fourth data in an operation domain of the vector extension instruction if the processing instruction decoded is the vector extension instruction; and
  determine a seventh storage address of the plurality of pieces of third data according to a data size and the base address of the source data of the plurality of pieces of third data, and send the seventh storage address to the continuous-data caching unit;
the continuous-data caching unit is further configured to:
  create a cache space for the plurality of pieces of third data and the plurality of pieces of fourth data respectively;
  read the plurality of pieces of third data from an external memory according to the seventh storage address, and cache the plurality of pieces of third data into the cache space; and
  send the plurality of pieces of third data cached to the decoding unit once the third data in the cache space reaches a fourth preset quantity;
the decoding unit is further configured to:
  extend the plurality of pieces of third data according to the plurality of pieces of third data and the extension parameter from the continuous-data caching unit to obtain the plurality of pieces of fourth data; and
  determine an eighth storage address of the plurality of pieces of fourth data according to a data size and the base address of the destination data of the plurality of pieces of fourth data, and send the plurality of pieces of fourth data and the eighth storage address to the continuous-data caching unit; and
the continuous-data caching unit is further configured to:
  cache the plurality of pieces of fourth data into the cache space; and
  send the plurality of pieces of fourth data cached to the eighth storage address of the external memory, once the fourth data in the cache space reaches a fifth preset quantity.

Article A8. The apparatus of A7, wherein there are M pieces of third data, and the extension parameter includes M extension parameter bits corresponding to the M pieces of third data, wherein M is an integer greater than 1;
  wherein extending the plurality of pieces of third data according to the plurality of pieces of third data and the extension parameter from the continuous-data caching unit to obtain the plurality of pieces of fourth data includes:
    determining $k_m$ pieces of data in the $m^{th}$ data position according to the $m^{th}$ third data and the $m^{th}$ extension parameter bit corresponding to the $m^{th}$ third data, wherein $1 \leq m \leq M$, and $k_m \geq 0$; and
    obtaining the plurality of pieces of fourth data according to data in M data positions.

Article A9. An artificial intelligence chip comprising the data processing apparatus of any one of A1 to A8.

Article A10. An electronic device comprising the artificial intelligence chip of A9.

Article A11. A board card comprising a storage component, an interface apparatus, a control component, and the artificial intelligence chip of A9; wherein the artificial intelligence chip is coupled with the storage component, the control component, and the interface apparatus respectively; the storage component is configured to store data; the interface apparatus is configured to implement data transmission between the artificial intelligence chip and an external device; and the control component is configured to monitor a state of the artificial intelligence chip.

The embodiments of the present disclosure have been described in detail above. The principles and embodiments of the present disclosure are described in connection with illustrative examples. It is to be understood that the descriptions of the foregoing embodiments are merely used to help understand the method and core ideas of the present disclosure. Any changes or modifications based on the embodiments and the application scope of the present disclosure made by those skilled in the art, without departing from the spirits of the present disclosure, shall all be encompassed within the protection scope of the present disclosure. Therefore, the present disclosure is not to be limited by the specification.

What is claimed is:

1. A data processing apparatus, comprising a decoding unit, a discrete-address determining unit, a continuous-data caching unit, a data read/write unit, and a storage unit; wherein the decoding unit is configured to decode a processing instruction received to obtain a processing instruction decoded, and determine a plurality of pieces of data corresponding to the processing instruction, a base address of source data of the plurality of pieces of data, a base address of destination data of the plurality of pieces of data, a data offset address of discrete data of the plurality of pieces of data, and a data size of continuous data of the plurality of pieces of data; the source data of the plurality of pieces of data comprises the discrete data or the continuous data; the decoding unit is further configured to determine a first storage address of the continuous data according to a base address of the continuous data and the data size of the continuous data;
  the discrete-address determining unit is coupled with the decoding unit and the data read/write unit, and is configured to determine a second storage address of the discrete data according to a base address of the discrete data and the data offset address of the discrete data, and send the second storage address to the data read/write unit;
  the continuous-data caching unit is coupled with the decoding unit and the data read/write unit, and is configured to create a cache space for the continuous data, cache the continuous data of the first storage address into the cache space and send the continuous data to the data read/write unit, or receive the continuous data from the data read/write unit, cache the continuous data received from the data read/write unit into the cache space and send the continuous data to the first storage address; and the data read/write unit is coupled with the storage unit, and is configured to read the discrete data from the storage unit according to the second storage address of the discrete data and send the discrete data read to the continuous-data caching unit, or receive the continuous data sent from the continuous-data caching unit and write the continuous data received into the storage unit according to the second storage address of the discrete data.

2. The apparatus of claim 1, wherein the data offset address includes an offset vector base address and an offset size, and the discrete-address determining unit includes:

an offset load subunit configured to determine an offset storage address of each piece of the discrete data according to the offset size and the offset vector base address of the discrete data, and read an offset of each piece of the discrete data from an offset storage address of each piece of the discrete data; and a discrete-address generation subunit configured to determine the second storage address of each piece of the discrete data according to the offset of each piece of the discrete data and the base address of the discrete data, and send the second storage address to the data read/write unit.

3. The apparatus of claim 1, wherein the data read/write unit includes:

a scatter addr. queue subunit configured to receive and store the second storage address of the discrete data; and a load store queue subunit configured to read the discrete data from the storage unit according to the second storage address of the discrete data and send the discrete data read to the continuous-data caching unit, or receive the continuous data sent from the continuous-data caching unit and write the continuous data received into the storage unit according to the second storage address of the discrete data.

4. The apparatus of claim 1, wherein the processing instruction includes a data transfer instruction, and if the processing instruction decoded is the data transfer instruction, the source data of the plurality of pieces of data is the discrete data, the destination data of the plurality of pieces of data is the continuous data, the base address of the source data is the base address of the discrete data, and the base address of the destination data is the base address of the continuous data, wherein the data read/write unit is configured to:
read the discrete data from the storage unit according to the second storage address of the discrete data; and
send the discrete data read to the continuous-data caching unit; and the continuous-data caching unit is configured to:
cache the discrete data received from the data read/write unit into the cache space to obtain the continuous data; and
send the continuous data in the cache space to a first storage address of an external memory, once the continuous data in the cache space reaches a first preset quantity.

5. The apparatus of claim 1, wherein the processing instruction includes a scatter store instruction, and if the processing instruction decoded is the scatter store instruction, the source data of the plurality of pieces of data is the continuous data, the destination data of the plurality of pieces of data is the discrete data, the base address of the source data is a base address of the continuous data, and the base address of the destination data is the base address of the discrete data, wherein the continuous-data caching unit is configured to:
read the continuous data according to a first storage address of an external memory;
cache the continuous data read into the cache space; and
send the continuous data in the cache space to the data read/write unit, once the continuous data in the cache space reaches a second preset quantity; and the data read/write unit is configured to:
receive the continuous data from the continuous-data caching unit; and
write the continuous data received into the storage unit according to the second storage address of the discrete data.

6. The apparatus of claim 1, wherein the processing instruction includes a data transfer instruction, and if the processing instruction decoded is the data transfer instruction, the source data of the plurality of pieces of data is the discrete data, the destination data of the plurality of pieces of data is the continuous data, the base address of the source data is the base address of the discrete data, and the base address of the destination data is the base address of the continuous data, wherein the decoding unit is further configured to:
determine a transfer mode of the data transfer instruction if the processing instruction decoded is the data transfer instruction;
determine a base address of source data of a plurality of pieces of first data, a base address of destination data of the plurality of pieces of first data, a data offset address of the plurality of pieces of first data, an offset stride of a plurality of pieces of second data, and a destination base address stride of the plurality of pieces of second data in an operation domain of the data transfer instruction if the transfer mode of the data transfer instruction is a multi-vector transfer mode;
determine a third storage address of the plurality of pieces of first data according to the base address of the destination data of the plurality of pieces of first data and the data size of the continuous data; and
determine a fourth storage address of the plurality of pieces of second data according to the third storage address of the plurality of pieces of first data and the destination base address stride of the plurality of pieces of second data;

the discrete-address determining unit is further configured to:
determine a fifth storage address of the plurality of pieces of first data according to the data offset address and the base address of source data of the plurality of pieces of first data;
determine a sixth storage address of the plurality of pieces of second data according to the fifth storage address of the plurality of first data and an offset stride of the plurality of pieces of second data; and
send the fifth storage address and the sixth storage address to the data read/write unit;

the data read/write unit is further configured to:
read the first data from the storage unit according to the fifth storage address and read the second data from the storage unit according to the sixth storage address; and
send the first data read and the second data read to the continuous-data caching unit; and the continuous-data caching unit is further configured to:

create a cache space for the plurality of pieces of first data and the plurality of pieces of second data respectively;

cache the first data and the second data received from the data read/write unit into the cache space respectively; and send the continuous data in the cache space to a third storage address of an external memory once the first data in the cache space reaches a third preset quantity, and send the continuous data in the cache space to a fourth storage address of the external memory once the second data in the cache space reaches the third preset quantity.

7. The apparatus of claim 1, wherein the processing instruction includes a vector extension instruction, and if the processing instruction decoded is the vector extension instruction, the source data of the plurality of pieces of data is the continuous data, the destination data of the plurality of pieces of data is the continuous data, the base address of the source data is the base address of the continuous data, and the base address of the destination data is the base address of the continuous data, wherein the decoding unit is further configured to:

determine a base address of source data of a plurality of pieces of third data, a base address of destination data of a plurality of pieces of fourth data, a data size of the plurality of pieces of fourth data, and an extension parameter of the plurality of pieces of fourth data in an operation domain of the vector extension instruction if the processing instruction decoded is the vector extension instruction; and determine a seventh storage address of the plurality of pieces of third data according to a data size and the base address of the source data of the plurality of pieces of third data, and send the seventh storage address to the continuous-data caching unit;

the continuous-data caching unit is further configured to:

create a cache space for the plurality of pieces of third data and the plurality of pieces of fourth data respectively;

read the plurality of pieces of third data from an external memory according to the seventh storage address, and cache the plurality of pieces of third data into the cache space; and send the plurality of pieces of third data cached to the decoding unit once the third data in the cache space reaches a fourth preset quantity;

the decoding unit is further configured to:

extend the plurality of pieces of third data according to the plurality of pieces of third data and the extension parameter from the continuous-data caching unit to obtain the plurality of pieces of fourth data; and determine an eighth storage address of the plurality of pieces of fourth data according to a data size and the base address of the destination data of the plurality of pieces of fourth data, and send the plurality of pieces of fourth data and the eighth storage address to the continuous-data caching unit; and the continuous-data caching unit is further configured to:

cache the plurality of pieces of fourth data into the cache space; and send the plurality of pieces of fourth data cached to the eighth storage address of the external memory, once the fourth data in the cache space reaches a fifth preset quantity.

8. The apparatus of claim 7, wherein there are M pieces of third data, and the extension parameter includes M extension parameter bits corresponding to the M pieces of third data, wherein M is an integer greater than 1;

wherein extending the plurality of pieces of third data according to the plurality of pieces of third data and the extension parameter from the continuous-data caching unit to obtain the plurality of pieces of fourth data includes:

determining $k_m$ pieces of data in the $m^{th}$ data position according to the $m^{th}$ third data and the $m^{th}$ extension parameter bit corresponding to the $m^{th}$ third data, wherein $1 \leq m \leq M$, and $k_m \geq 0$; and obtaining the plurality of pieces of fourth data according to data in M data positions.

* * * * *